(12) United States Patent
Kang et al.

(10) Patent No.: US 8,831,119 B2
(45) Date of Patent: Sep. 9, 2014

(54) METHOD AND APPARATUS FOR TRANSMITTING SYNCHRONIZATION SIGNAL IN MULTI-NODE SYSTEM

(75) Inventors: Ji Won Kang, Anyang-si (KR); Jin Young Chun, Anyang-si (KR); Sung Ho Park, Anyang-si (KR); Su Nam Kim, Anyang-si (KR); Bin Chul Ihm, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 596 days.

(21) Appl. No.: 13/169,502

(22) Filed: Jun. 27, 2011

(65) Prior Publication Data

US 2011/0317780 A1 Dec. 29, 2011

Related U.S. Application Data

(60) Provisional application No. 61/358,948, filed on Jun. 28, 2010, provisional application No. 61/427,103, filed on Dec. 23, 2010.

(30) Foreign Application Priority Data

May 16, 2011 (KR) .................. 10-2011-0045725

(51) Int. Cl.
*H04K 1/10* (2006.01)
*H04L 27/28* (2006.01)
*H04L 5/00* (2006.01)
*H04L 27/26* (2006.01)
*H04W 56/00* (2009.01)

(52) U.S. Cl.
CPC .......... *H04L 27/2613* (2013.01); *H04L 5/0053* (2013.01); *H04L 5/0007* (2013.01); *H04W 56/0085* (2013.01)
USPC ............ 375/260; 375/259; 375/220; 375/356

(58) Field of Classification Search
CPC ............................. H04L 5/007; H04L 5/0053
USPC .......................... 375/259, 260, 299, 356, 220
See application file for complete search history.

(56) References Cited

U.S. PATENT DOCUMENTS

| | | | | |
|---|---|---|---|---|
| 8,242,907 | B2 * | 8/2012 | Butler et al. | 340/572.1 |
| 8,265,031 | B2 * | 9/2012 | Tanno et al. | 370/330 |
| 8,320,486 | B2 * | 11/2012 | Kotecha | 375/267 |
| 2010/0080137 | A1 * | 4/2010 | Vedantham et al. | 370/252 |

* cited by examiner

*Primary Examiner* — Qutbuddin Ghulamali
(74) *Attorney, Agent, or Firm* — Morgan, Lewis & Bockius LLP

(57) ABSTRACT

A method of transmitting a synchronization signal in a multi-node system having a plurality of nodes and a base station for controlling the plurality of node is provided. The method includes: generating a synchronization signal sequence; and mapping the generated synchronization signal sequence to a resource element, and thereafter transmitting the mapped synchronization signal sequence to a user equipment via at least one node among the plurality of nodes, wherein the synchronization signal sequence is generated based on an identifier (ID) of a transmission node for transmitting the synchronization signal sequence.

11 Claims, 15 Drawing Sheets

METHOD AND APPARATUS FOR TRANSMITTING SYNCHRONIZATION SIGNAL IN MULTI-NODE SYSTEM

CROSS-REFERENCE TO RELATED APPLICATIONS

This application claims the benefit of priority of U.S. Provisional application Ser. No. 61/358,948 filed on Jun. 28, 2010, Ser. No. 61/427,103 filed on Dec. 23, 2010 and Korean Patent Application No. 10-2011-0045725 filed on May 16, 2011 which are incorporated by reference in its entirety herein.

BACKGROUND

1. Technical Field

The present invention relates to wireless communication, and more particularly, to a method and apparatus for transmitting a synchronization signal in a multi-node system.

2. Related Art

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and propagated. To satisfy the required high data transfer amount, a carrier aggregation technique, a recognition radio technique, or the like for effectively using more frequency bands, and a multiple antenna technique, a multiple base station cooperation technique, or the like for increasing data capacity within a limited frequency have recently drawn attention.

In addition, the wireless network has been evolved in a direction of increasing density of a node capable of accessing to an area around a user. Herein, the node implies an antenna (or antenna group) which is separated from other antenna by a certain distance or farther in a distributed antenna system (DAS). However, the node is not limited to this definition, and thus can also be used in a broader sense. That is, the node may be a pico-cell eNB (PeNB), a home eNB (HeNB), a remote radio head (RRH), a remote radio unit (RRU), a relay, a distributed antenna, etc. A wireless communication system having such a node with higher density can provide higher system performance by cooperation between nodes. That is, better system performance can be achieved when one base station controller manages transmission and reception of respective nodes and thus the nodes operate as if they are antennas or an antenna group for one cell, in comparison with a case where the respective nodes operate as an independent base station (BS), advanced BS (ABS), Node-B (NB), eNode-B (eNB), access point (AP), etc., and thus do not cooperate with each other. Hereinafter, a wireless communication system including a plurality of nodes is referred to as a multi-node system. In the multi-node system, a node for transmitting a signal to a user equipment may differ depending on the user equipment, and also a node for receiving a signal from the user equipment may also differ depending on the user equipment. Accordingly, the multi-node system requires an identifier (ID) capable of identifying each node, and there is a need for a method for reporting the ID of the node to the user equipment.

SUMMARY

The present invention provides a method and apparatus for transmitting a synchronization signal capable of delivering an identifier (ID) of a node in a multi-node system.

According to an aspect of the present invention, a method of transmitting a synchronization signal in a multi-node system having a plurality of nodes and a base station for controlling the plurality of node is provided. The method includes: generating a synchronization signal sequence; and mapping the generated synchronization signal sequence to a resource element, and thereafter transmitting the mapped synchronization signal sequence to a user equipment via at least one node among the plurality of nodes, wherein the synchronization signal sequence is generated based on an identifier (ID) of a transmission node for transmitting the synchronization signal sequence.

In the aforementioned aspect of the present invention, the ID for the transmission node may have a pre-defined mapping relation with respect to an ID of the base station or an ID of a cell controlled by the base station.

In addition, the ID of the transmission node may coincide with at least one of seed numbers constituting the ID of the base station or the cell controlled by the base station, where the seed number includes a seed number $N_{ID}^{(1)}$ indicating a cell ID group and a seed number $N_{ID}^{(2)}$ indicating an ID included in the cell ID group.

In addition, when the ID of the transmission node consists of N bits, the ID of the base station or the cell controlled by the base station may consist of upper M bits out of the N bits, where N and M are natural numbers and N is greater than M.

In addition, the synchronization signal sequence may be a sequence generated using a seed number $N_{ID}^{(3)}$ for determining the ID of the transmission node.

In addition, the synchronization signal sequence may be generated by scrambling a sequence generated using a cell ID group $N_{ID}^{(1)}$ which is a seed number constituting an ID of a cell controlled by the base station or an ID $N_{ID}^{(2)}$ included in the cell ID group by the use of a sequence generated using a seed number $N_{ID}^{(3)}$ for determining the ID of the transmission node.

In addition, the synchronization signal sequence may be allocated to 63 subcarriers in a frequency domain, and may be transmitted in last two OFDM symbols of $1^{st}$ and $11^{th}$ slots within a frame in a time domain.

In addition, the synchronization signal generated based on the ID of the transmission node may be transmitted by using a resource element different from that of a synchronization signal generated based on an ID of a cell controlled by the base station.

In addition, each of the plurality of nodes may be an antenna (or antenna group) coupled to the base station in a wired fashion.

According to another aspect of the present invention, a method of transmitting a synchronization signal of a user equipment in a multi-node system having a plurality of nodes and a base station for controlling the plurality of node is provided. The method includes: receiving a synchronization signal based on an ID of a cell controlled by the base station; and receiving a synchronization signal based on an ID of at least one node among the plurality of nodes.

In the aforementioned aspect of the present invention, each of the plurality of nodes may be an antenna (or antenna group) coupled to the base station in a wired fashion.

According to another aspect of the present invention, an apparatus for transmitting a synchronization signal is provided. The apparatus includes: a radio frequency (RF) unit for transmitting and receiving a radio signal; and a processor coupled to the RF unit, wherein the RF unit includes a plurality of antennas deployed in a distributed manner, and the processor generates a synchronization signal sequence, and maps the generated synchronization signal sequence to a resource element, and thereafter transmits the mapped synchronization signal sequence to a user equipment via at least one node among the plurality of nodes, wherein the synchronization signal sequence is generated based on an identifier (ID) of a transmission node for transmitting the synchronization signal sequence.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

Figure 1:
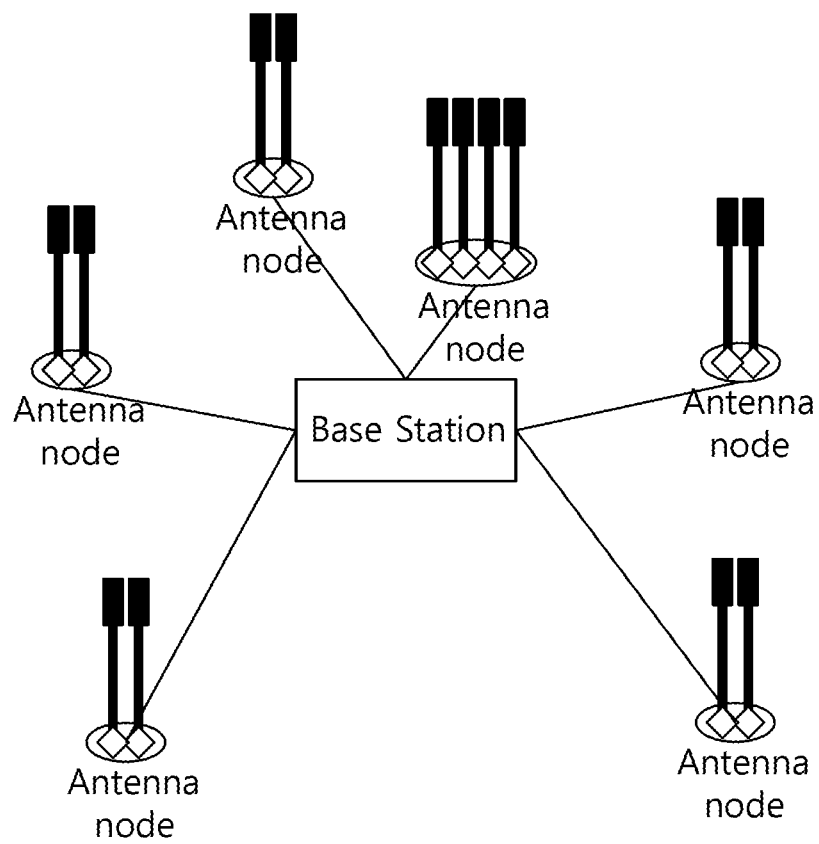
FIG. 1 shows an example of a multi-node system.

FIG. 1 shows an example of a multi-node system.

Referring to FIG. 1, the multi-node system includes a base station (BS) and a plurality of nodes.

In FIG. 1, a node indicated by an antenna node may imply a macro BS (or eNB), a pico-cell eNB (PeNB), a home eNB (HeNB), a remote radio head (RRH), a relay, a distributed antenna, etc. Such a node is also referred to as a point.

In the multi-node system, if one BS controller manages transmission or reception of all nodes and thus individual nodes operate as if they are a part of one cell, then the system can be regarded as a distributed antenna system (DAS) which constitutes one cell. In the DAS, separate node identifiers (IDs) may be given to the individual nodes, or the individual nodes may operate as if they are some antenna groups within a cell without the additional node IDs. In other words, the DAS is a system in which antennas (i.e., nodes) are deployed in various positions within a cell in a distributed manner, and these antennas are managed by the BS. The DAS is different from a conventional centralized antenna system (CAS) in which antennas of the BS are concentrated in a cell center.

If the individual nodes have separate cell IDs and perform scheduling and handover in the multi-node system, this can be regarded as a multi-cell (e.g., macro-cell/femto-cell/pico-cell) system. If the multiple cells are configured such that they overlap with each other according to coverage, this is called a multi-tier network.

Although the DAS will be described hereinafter as an example of the multi-node system, the features of the present invention are not limited thereto, and thus the present invention can also apply to the multi-tier network.

Figure 2:
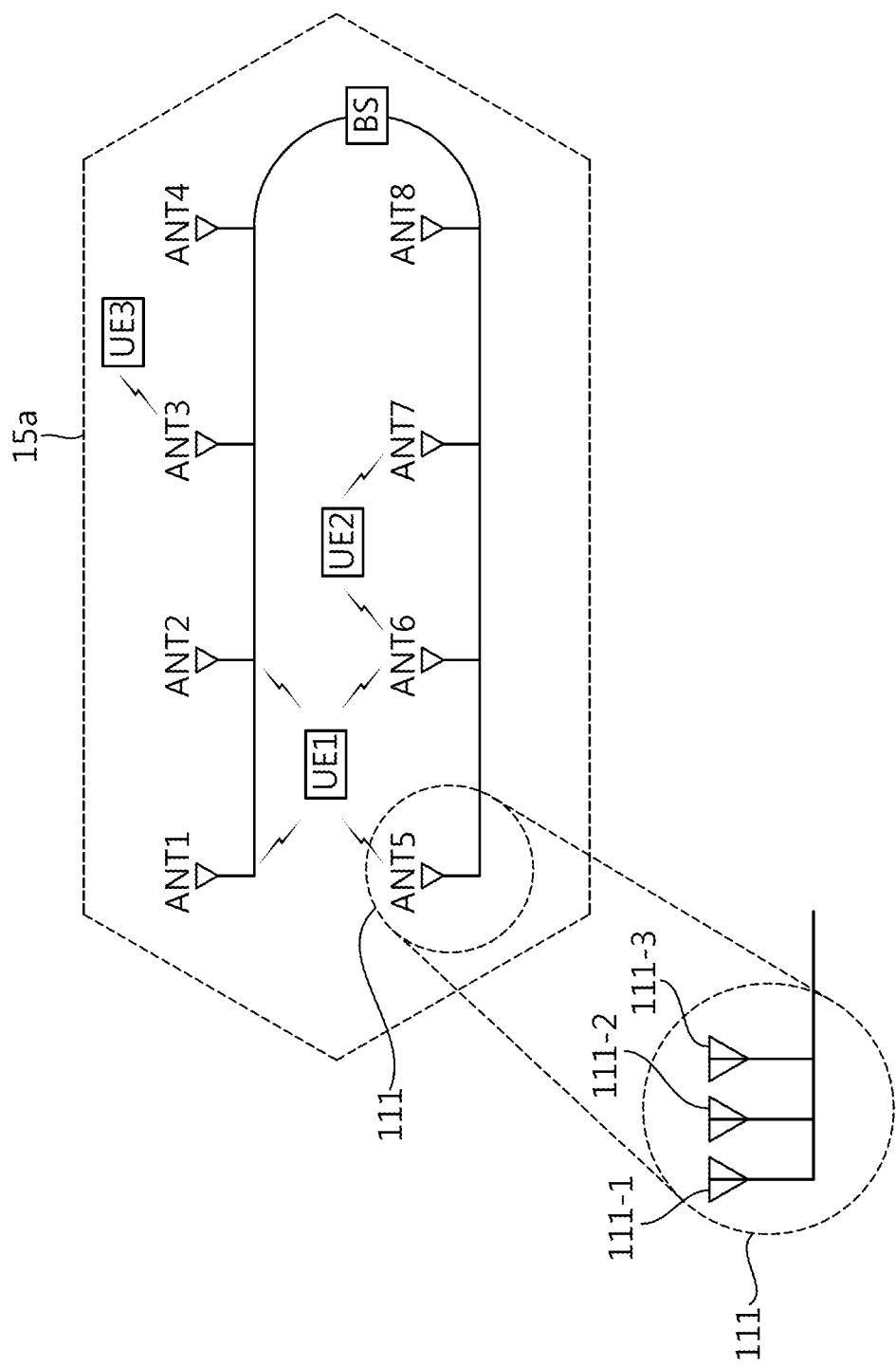
FIG. 2 shows a distributed antenna system as an example of a multi-node system.

FIG. 2 shows a DAS as an example of a multi-node system.

Referring to FIG. 2, the DAS includes a BS and a plurality of BS antennas (e.g., ANT 1 to ANT 8, hereinafter a BS antenna is simply referred to as an antenna). The ANT 1 to the ANT 8 can be coupled to the BS in a wired fashion. Unlike the conventional CAS, the DAS has antennas which are deployed in various positions within a cell in a distributed manner instead of being concentrated in a specific position (e.g., a cell center) of a cell 15a. Herein, one antenna may exist in each separate place within a cell (in case of ANTs 1 to 4 and ANTs 6 to 8). In addition, similarly to the ANT 5 (indicated by a reference number 111), several antennas 111-1, 111-2, and 111-3 may exist in a concentrated manner, that is, may be distributed as an antenna group. The antenna group may constitute one antenna node.

The antennas may be distributed in such a manner that antenna coverage overlaps so that rank 2 (or higher) transmission is possible. That is, antenna coverage of each antenna may reach up to an adjacent antenna. In this case, user equipments (UEs) existing within a cell may receive signals of which strengths change variously according to a location in the call, a channel state, etc., from a plurality of antennas.

Referring to the example of FIG. 2, a UE 1 can receive a signal having good signal strength from the ANTs 1, 2, 5, and 6. On the other hand, signals transmitted from the ANTs 3, 4, 7, and 8 may have a negligible effect on the UE 1 due to a path loss.

A UE 2 can receive a signal having good signal strength from the ANTs 6 and 7, and signals transmitted from the remaining antennas may have a negligible effect. Likewise, a UE 3 can receive a signal having good signal strength from only the ANT 3, and signals of the remaining antennas may have negligible weak signal strength.

Due to the aforementioned feature, the DAS may easily perform multiple input multiple output (MIMO) communication with respect to UEs separated from each other within a cell. In the aforementioned example, communication can be performed for the UE 1 through the ANTs 1, 2, 5, and 6, for the UE 2 through the ANT 7, and for the UE 3 through the ANT 3. The ANTs 4 and 8 may transmit signals for the UE 2 or the UE 3, or may transmit no signal. That is, the ANTs 4 and 8 may operate optionally in an off state.

As described above, when MIMO communication is performed in the DAS, the number of layers (i.e., the number of transmission streams) of each UE may be various. In addition, a different antenna (or antenna group) may be allocated to each UE. In other words, the DAS can support a specific antenna (or specific antenna group) for each UE among all antennas in a system. An antenna provided to a UE may vary over time.

Figure 3:
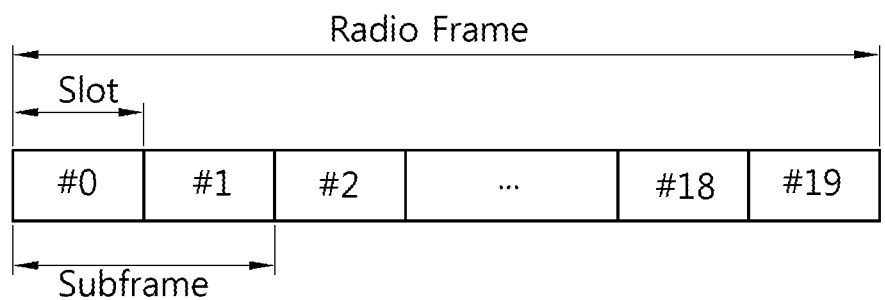
FIG. 3 shows a structure of a frequency division duplex (FDD) radio frame in $3^{rd}$ generation partnership project (3GPP) long term evolution (LTE).

FIG. 3 shows a structure of a frequency division duplex (FDD) radio frame in 3GPP LTE. Such a radio frame structure is called a frame structure type 1.

Referring to FIG. 3, a radio frame includes 10 subframes. One subframe is defined as two consecutive slots. A time required for transmitting one subframe is called a transmission time interval (TTI). A time length of the radio frame is $T_f=307200*T_s=10$ ms, and consists of 20 slots. A time length of the slot is $T_{slot}=15360*T_s=0.5$ ms, and is numbered from 0 to 19. A downlink (DL) in which each node or BS transmits a signal to a UE and an uplink (UL) in which the UE transmits a signal to each node or BS are separated in a frequency domain.

Figure 4:
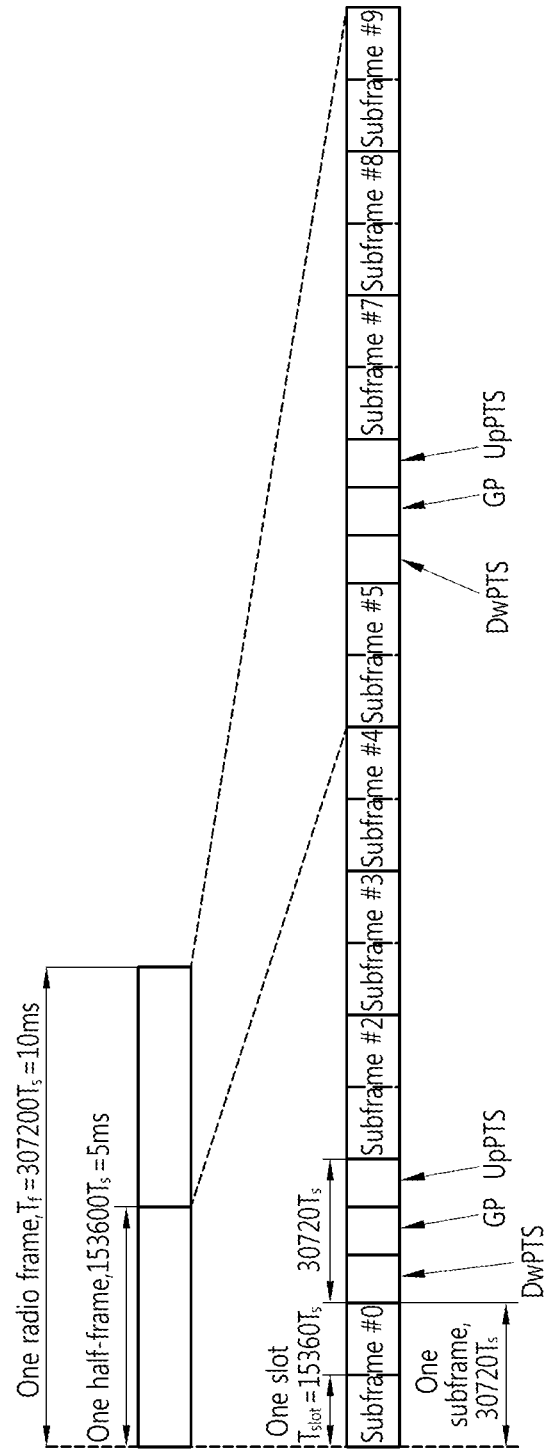
FIG. 4 shows a time division duplex (TDD) radio frame structure in 3GPP LTE.

FIG. 4 shows a time division duplex (TDD) radio frame structure in 3GPP LTE. Such a radio frame structure is called a frame structure type 2.

Referring to FIG. 4, one radio frame has a length of 10 milliseconds (ms), and consists of two half-frames each having a length of 5 ms. One half-frame consists of five subframes each having a length of 1 ms. Each subframe is designated as any one of a UL subframe, a DL subframe, and a special subframe. One radio frame includes at least one UL subframe and at least one DL subframe. One subframe consists of two consecutive slots. For example, one subframe may have a length of 1 ms, and one slot may have a length of 0.5 ms.

The special subframe is a specific period positioned between the UL subframe and the DL subframe for the purpose of UL-DL separation. One radio frame includes at least one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization of a UE. The GP is positioned between the UL time slot and the DL time slot and is used to remove interference that occurs in UL transmission due to a multi-path delay of a DL signal.

In FDD and TDD radio frames, one slot includes a plurality of orthogonal frequency division multiplexing (OFDM) symbols in a time domain and a plurality of resource blocks (RBs) in a frequency domain. Since 3GPP LTE uses OFDMA in DL transmission, the OFDM symbol is for expressing one symbol period, and thus can be referred to as other terms such as SC-FDMA symbol. The RB is a resource allocation unit, and includes a plurality of consecutive subcarriers in one slot.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference in order to explain the radio frame structure described with reference to FIG. 3 and FIG. 4.

The structure of the radio frame is for exemplary purposes only, and thus the number of subframes included in the radio frame or the number of slots included in the subframe, and the number of OFDM symbols included in the slot may change variously.

Figure 5:
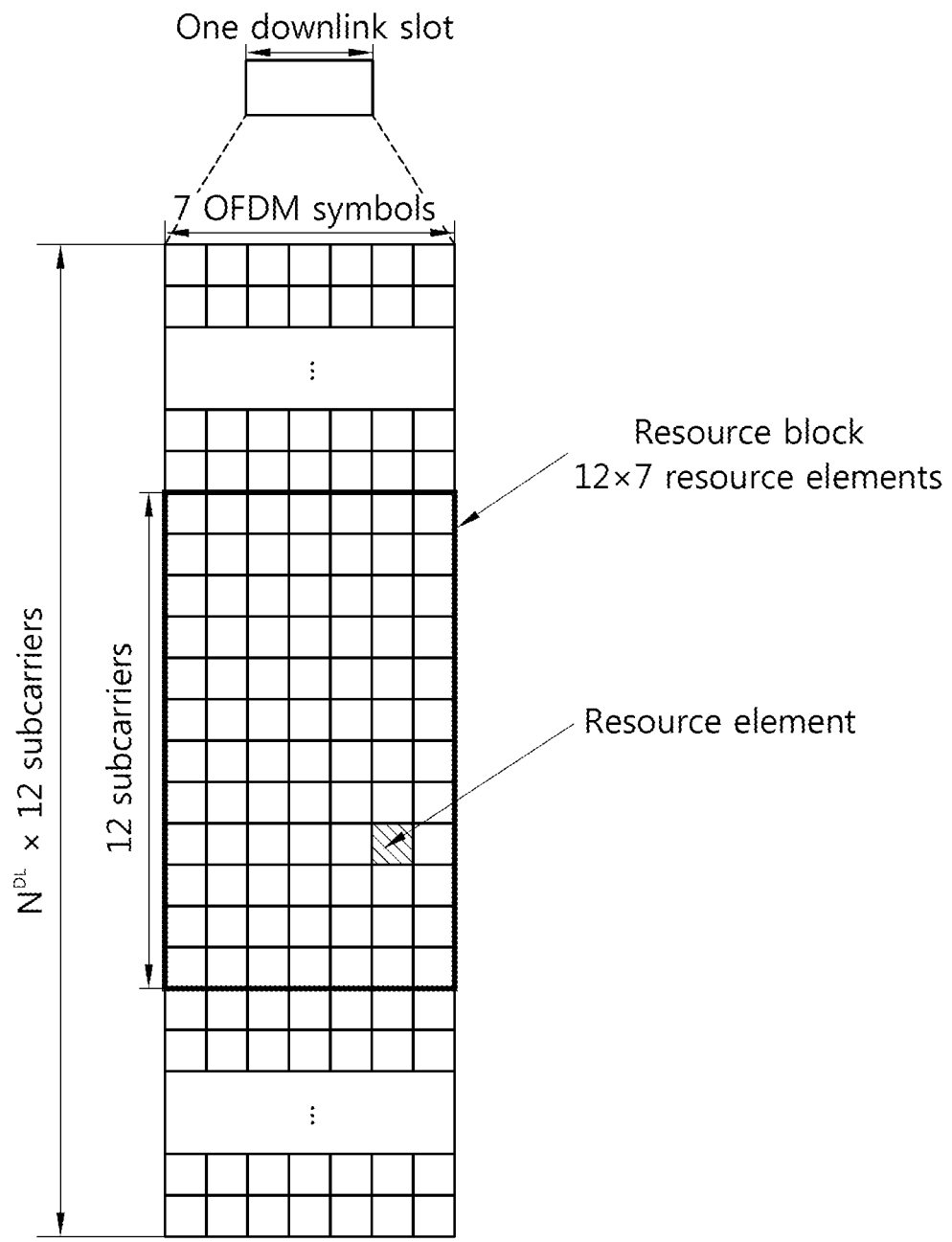
FIG. 5 shows an example of a resource grid for one downlink slot.

FIG. 5 shows an example of a resource grid for one DL slot.

Referring to FIG. 5, one DL slot includes a plurality of OFDM symbols in a time domain. It is described herein that one DL slot includes 7 OFDMA symbols and one resource block (RB) includes 12 subcarriers in a frequency domain for exemplary purposes only, and the present invention is not limited thereto.

Each element on the resource grid is referred to as a resource element, and one RB includes 12×7 resource elements. The number $N^{DL}$ of RBs included in the DL slot depends on a DL transmission bandwidth determined in a cell. The aforementioned resource grid for the DL slot can also apply to the UL slot.

Figure 6:
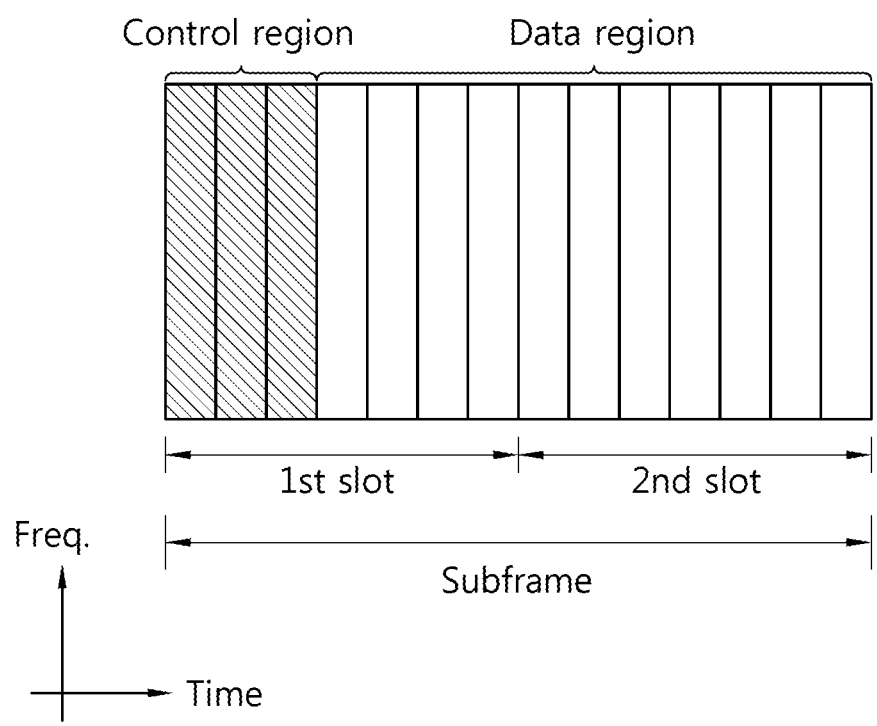
FIG. 6 shows an example of a downlink subframe structure.

FIG. 6 shows an example of a DL subframe structure.

Referring to FIG. 6, a subframe includes two consecutive slots. Up to three preceding OFDM symbols of a $1^{st}$ slot in the subframe may correspond to a control region to which control channels are allocated. The remaining OFDM symbols may correspond to a data region to which a physical downlink shared channel (PDSCH) is allocated.

Examples of a DL control channel include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. Control information transmitted through the PDCCH is referred to as downlink control information (DCI). The DCI indicates UL resource allocation information, DL resource allocation information, a UL transmit power control command for any UE groups, etc. The PHICH carries an acknowledgement (ACK)/not-acknowledgement (NACK) signal for a UL hybrid automatic repeat request (HARQ). That is, the ACK/NACK signal for UL data transmitted by a UE is transmitted through the PHICH.

The PDSCH is a channel for transmitting control information and/or data. The UE may decode the control information transmitted through the PDCCH to read the data transmitted through the PDSCH.

The UE is subjected to a cell search procedure to access to a specific system. In the cell search procedure, the UE detects a physical layer signal called a synchronization signal, which is broadcast in each cell, to demodulate a DL signal at correct timing and performs time/frequency synchronization to transmit a UL signal. In the cell search procedure, the UE obtains a cell ID from the synchronization signal by performing time/frequency synchronization. Thereafter, the UE obtains a system parameter by using a physical broadcast channel (PBCH) (or a superframe header in IEEE 802.16m). The UE uses the obtained parameter to attempt cell entry. Examples of the synchronization signal includes a primary synchronization signal (PSS) and a secondary synchronization signal (SSS) in 3GPP LTE, and includes a preamble in IEEE 802.16m.

Figure 7:
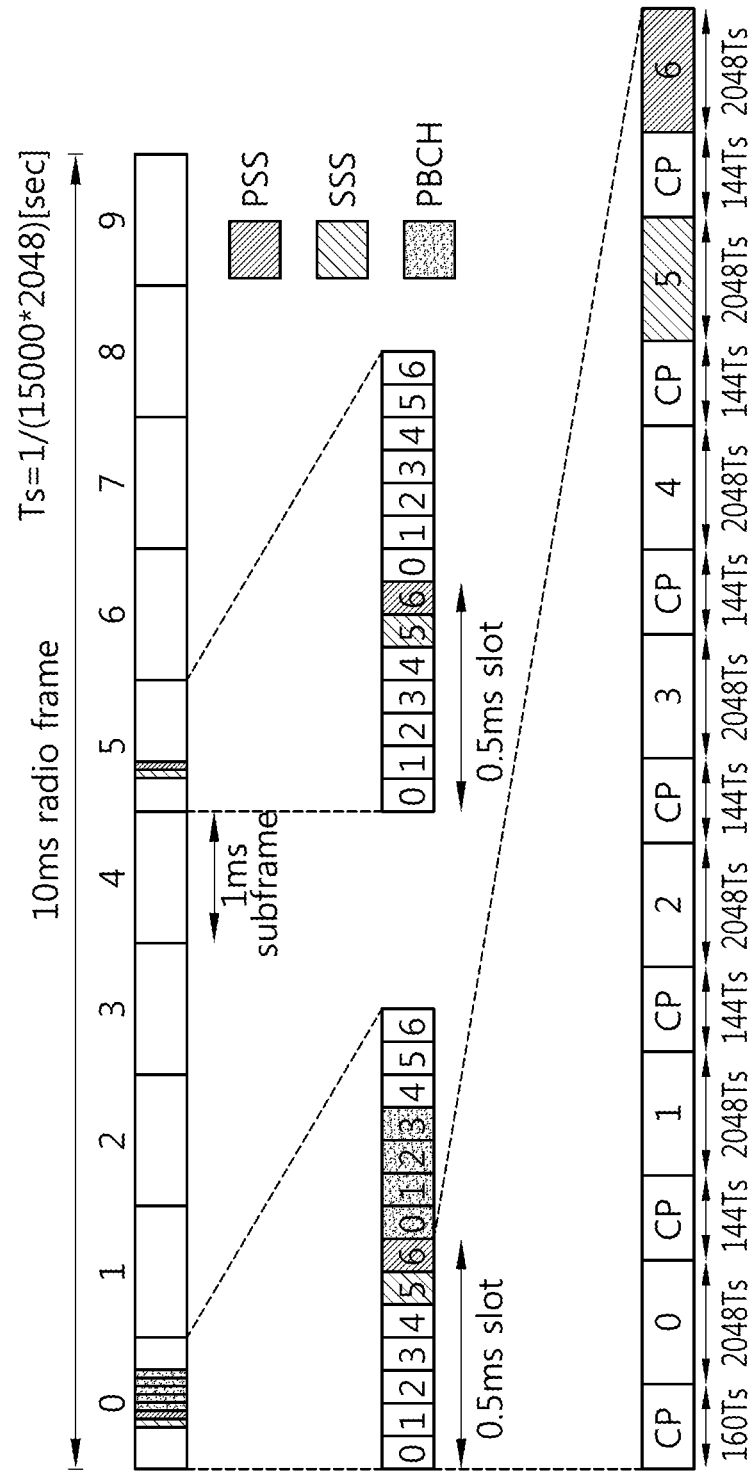
FIG. 7 shows orthogonal frequency division multiplexing (OFDM) symbols for transmitting a synchronization signal and a physical broadcast channel (PBCH) within a frame (i.e., a radio frame) in a frequency division duplex (FDD) system.

FIG. 7 shows OFDM symbols for transmitting a synchronization signal and a PBCH within a frame (i.e., a radio frame) in an FDD system.

Referring to FIG. 7, a PSS is transmitted through last OFDM symbols of a slot #0 and a slot #10 within a frame. The same PSS is transmitted using 2 OFDM symbols. The PSS is used to obtain time domain synchronization such as OFDM symbol synchronization, slot synchronization, or the like and/or frequency domain synchronization. A Zadoff-Chu (ZC) sequence can be used as the PSS. At least one PSS exists in a wireless communication system.

An SSS is transmitted through an immediately previous OFDM symbol from the last OFDM symbols of the slot #0 and the slot #10 within the frame. That is, the SSS and the PSS can be transmitted through contiguous OFDM symbols. In addition, different SSSs are transmitted through two OFDM symbols being transmitted. The SSS is used to obtain frame synchronization and/or CP configuration of a cell, i.e., usage information of a normal CP or an extended CP. An m-sequence may be used as the SSS. One OFDM symbol includes two m-sequences. For example, if one OFDM symbol includes 63 subcarriers, two m-sequences each having a length of 31 are mapped to one OFDM symbol.

A physical broadcast channel (PBCH) is located at a subframe 0 (i.e., a $1^{st}$ subframe) of a radio frame in a time domain. For example, the PBCH can be transmitted in a $2^{nd}$ slot of the subframe 0, i.e., first four OFDM symbols (i.e., an OFDM symbol 0 to an OFDM symbol 3) of a slot 1. The PBCH can be transmitted by using the 72 consecutive subcarriers in a frequency domain. The PBCH carries a limited number of parameters which are most frequently transmitted and are essential for initial cell access. A master information block (MIB) includes these essential parameters. In the PBCH, each MIB transmission is spread with a period of 40 ms. That is, transmission is performed in four consecutive frames. This is to avoid missing of one entire MIB.

In IEEE 802.16m, a preamble plays a role of the aforementioned synchronization signal. There are two types of preambles in IEEE 802.16m (it is called an advanced preamble in IEEE 802.16m and it can be referred to as an A-preamble (AP)). That is, the two types are a primary AP (hereinafter, a PA-preamble) and a secondary AP (hereinafter, an SA-preamble). One PA-preamble symbol and two SA-preamble symbols are present within a superframe.

Figure 8:
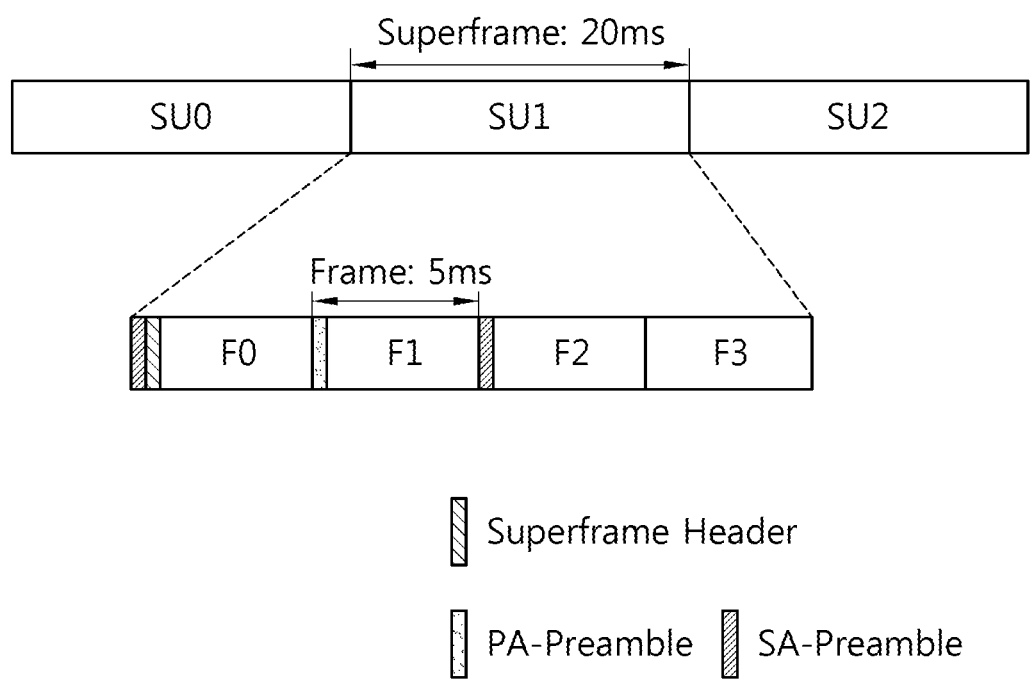
FIG. 8 shows a location of a preamble transmitted in institute of electrical and electronics engineers (IEEE) 802.16m.

FIG. 8 shows a location of a preamble transmitted in IEEE 802.16m.

Referring to FIG. 8, an A-preamble symbol is located at a $1^{st}$ symbol of a frame except for a last frame. A PA-preamble is located at a $1^{st}$ symbol of a $2^{nd}$ frame in a superframe. An SA-preamble is located at $1^{st}$ symbols of $1^{st}$ and $3^{rd}$ frames.

A sequence length for the PA-preamble is 216 irrespective of an FFT size. The PA-preamble carries information on a system bandwidth and a carrier configuration. When a subcarrier index 256 is reserved for a DC subcarrier, subcarrier allocation is performed by Equation 1 below.

$$PAPreambleCarrierSet = 2 \cdot k + 41 \qquad \text{[Equation 1]}$$

In Equation 1, 'PAPreambleCarrierSet' specifies all subcarriers allocated to a PA-preamble. In addition, k denotes a running index in the range of 0 to 215.

$N_{SAP}$ denotes the number of subcarriers allocated for an SA preamble, and is 144, 288, and 576 respectively for 512-FFT, 1024-FFT, and 2048-FFT. Subcarrier allocation is performed according to Equation 2 below. Subcarrier indices 256, 512, and 1024 are reserved for DC subcarriers respectively for 512-FFT, 1024-FFT, and 2048-FFT.

$$SAPreambleCarrierSet_n = n + 3 \cdot k + 40 \cdot \frac{N_{SAP}}{144} + \left\lfloor \frac{2 \cdot k}{N_{SAP}} \right\rfloor \qquad \text{[Equation 2]}$$

In Equation 2 above, '$SAPreambleCarrierSet_n$' specifies all subcarriers allocated to a specific SA-preamble. In addition, n denotes a segment ID as an index of SA-preamble carrier sets 0, 1, and 2, and k denotes an index in the range of 0 to ($N_{SAP}$−1) with respect to each FFT size.

Each segment uses an SA-preamble consisting of one carrier set among 3 available carrier sets. For example, a segment 0 uses an SA-preamble carrier set 0, a segment 1 uses an SA-preamble carrier set 1, and a segment 2 uses an SA-preamble carrier set 2.

In IEEE 802.16m, each cell ID has an integer value in the range of 0 to 767. A cell ID 'IDcell' is defined with a segment ID and an index for each segment according to Equation 3 below.

$$IDcell = 256n + Idx \qquad \text{[Equation 3]}$$

In Equation 3, n denotes a segment ID as an index of SA-preamble carrier sets 0, 1, and 2. Idx of Equation 3 above is given by Equation 4 below.

$$Idx = 2 \bmod(q, 128) + \lfloor q/128 \rfloor, \ q \text{ is a running index 0 to 255.} \qquad \text{[Equation 4]}$$

As described above, a UE operating according to IEEE 802.16m obtains a cell ID by using a preamble.

Hereinafter, a method of transmitting a synchronization signal in a multi-node system will be described.

In the multi-node system (e.g., DAS), an antenna node consisting of an antenna (or antenna group) must be provided selectively to a UE to effectively use a limited resource. That is, when the UE enters into a cell of the DAS system, it may be necessary for the UE to know a specific antenna node of a specific BS when communication is performed, and to report feedback information regarding a node of the antenna to the BS. This means that the UE must be able to recognize not only a cell ID but also an antenna node ID (hereinafter, AN-ID). If the UE can know an antenna node, the UE can transmit an AN-ID and a path loss of the antenna node to the BS when performing a process such as a bandwidth request (BR) or a feedback of channel state information.

As one method of reporting an antenna node to a UE, there is a method of transmitting a broadcast message including antenna node configuration information through a channel that can be recognized by all UEs within a cell. By using the broadcast message, the UE can know a configuration of each antenna node, and by using a reference signal or pilot identified for each antenna node, the UE can measure a path loss of each antenna node and report preferred antenna node information to the BS. However, when using the additional reference signal or pilot identified for each antenna node, there may be a problem in that system overhead increases. Therefore, there is a need for a method of identifying each antenna node without increasing the system overhead.

Now, a method of generating an AN-ID and a cell ID (hereinafter, the cell ID can be used in the meaning of a BS ID (BS-ID)) and determining a relation thereof in each node within a multi-node system will be described.

1. Method of Generating and Using AN-ID Independently in Each BS/Cell

In this method, each BS allocates separate AN-IDs independently to antenna nodes coupled to the BS or allocates the separate AN-IDs independently to antenna nodes belonging to each cell. This is a method in which overlapping AN-IDs can be allocated between antenna nodes coupled to different BSs/cells. For example, assume that cells 1 and 2 are present in a multi-node system. It is also assumed that N1 antenna nodes are coupled to the cell 1, and N2 antenna nodes are coupled to the cell 2. In this case, the cell 1 and the cell 2 have independent cell-IDs. For example, the cell 1 may have a cell-ID 1, and the cell 2 may have a cell-ID 2. Each cell can assign AN-IDs sequentially starting from 0 to antenna nodes coupled thereto. That is, an antenna node coupled to the cell 1 has any one of AN-IDs 0 to (N1−1), and an antenna node coupled to the cell 2 has any one of AN-IDs 0 to (N2−1). When a UE enters a specific cell, the AN-ID alone is not enough to predict the cell-ID, and thus the UE has to obtain both the cell-ID and the AN-ID.

2. Method of Determining and Using Specific Relation Between BS/Cell-Id and AN-ID In this method, a multi-node system assigns a unique AN-ID to all antenna nodes so that the AN-ID has a specific relation with an ID of a BS and/or cell coupled thereto.

Figure 9:
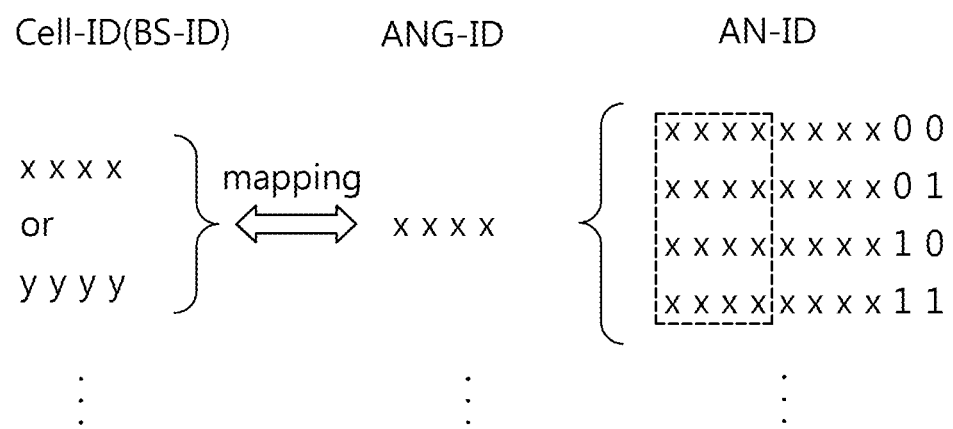
FIG. 9 shows an example of a method of determining and using a specific relation between a base station identifier (BS-ID) and an antenna identifier (AN-ID).

FIG. 9 shows an example of a method of determining and using a specific relation between a BS-ID or cell-ID and an AN-ID.

Referring to FIG. 9, a unique AN-ID is set to all antenna nodes within a multi-node system. For example, each AN-ID may consist of N bits, and an AN-ID having a different value may be allocated to each antenna node. In this case, antenna nodes coupled to the same BS or cell can be configured such that they have the same upper M bits (M<N). As such, the same upper M bits may become an antenna group ID (ANG-ID). Antenna nodes having the same antenna group ID may be antenna nodes coupled to the same BS/cell. In this case, the BS-ID/cell-ID and the ANG-ID may be determined to have the same value or may be determined according to a predetermined mapping relation.

That is, as shown in FIG. 9, the cell-ID and the ANG-ID may be equally XXXX, or may be determined to different values such that the cell-ID is YYYY, and the ANG-ID is XXXX, according to the predetermined mapping relation.

As such, when it is determined that a ID of an antenna node and an ID of a BS/cell have a specific relation, the UE can not only obtain the AN-ID but also predict the BS/cell ID at the same time. It is premised in this case that the UE knows, in advance, the determined relation between the AN-ID and the ANG-ID and the determined relation between the ANG-ID and the BS-ID/cell-ID.

A method of determining a relation between a BS/cell ID and AN-ID can be utilized when a plurality of BSs are intended to operate together with multiple nodes in a single DAS similarly to a method of performing control management by one BS (i.e., a control BS). That is, a BS-ID of each BS may play a role of an AN-ID, and a BS group ID (BSG-ID) may be set by grouping BS-IDs of the plurality of BSs. Thereafter, a BS-ID of the control BS may be set to the same value as the BSG-ID or may be set according to a predetermined mapping relation.

In addition to the aforementioned method, the BS/cell ID and the AN-ID can be set variously. For example, the AN-ID can be configured as a function of only some of constitutional elements of the BS/cell ID.

As one example, 504 (physical layer) cell IDs are present in LTE. The cell ID is grouped into 168 unique cell ID groups, and each group includes 3 cell IDs. Each cell ID is included in one cell ID group. That is, the cell ID is configured such as $N_{ID}^{cell}=3\ N_{ID}^{(1)}+N_{ID}^{(2)}$ in LTE. Herein, $N_{ID}^{(1)}$ denotes a cell ID group, and may be any one of values 0 to 167. $N_{ID}^{(2)}$ denotes a cell ID within a cell ID group, and may be any one of values 0 to 2. $N_{ID}^{(1)}$ and $N_{ID}^{(2)}$ may be a seed number for a cell ID. In this case, $N_{ID}^{(1)}$ can be expressed in 8 bits, and $N_{ID}^{(2)}$ can be expressed in 2 bits. In this case, an AN-ID allocated to antenna nodes coupled to the same BS/cell can be specified such that some bits of the aforementioned $N_{ID}^{(1)}$ and/of $N_{ID}^{(2)}$ are identical. For example, if the AN-ID is denoted by $N_{ID}^{node}$, the AN-ID can be configured in the same manner as the cell ID. That is, it can be configured as $N_{ID}^{node}=3\ N_{ID}^{(1)}+N_{ID}^{(2)}$. In this case, it can be specified such that the AN-ID of all antenna nodes coupled to the same BS and/or cell is generated using the same $N_{ID}^{(1)}$ as the cell ID. Then, the AN-ID of each antenna node is identified by $N_{ID}^{(2)}$.

Alternatively, all antenna nodes coupled to the same BS can generate an AN-ID by using the same $N_{ID}^{(2)}$, and upper 4 bits of $N_{ID}^{(1)}$ can be specified as the same bits. In this case, each antenna node can be identified only with lower 4 bits of $N_{ID}^{(1)}$. Then, only lower 4 bits of $N_{ID}^{(1)}$ need to be signaled to report an ID of each antenna node, thereby decreasing overhead in the signaling related to an antenna node.

In another example, if $N_{ID}^{node}$ denotes an ID of each antenna node and $N_{ID}^{(3)}$ denotes a new seed number for an antenna node other than $N_{ID}^{(1)}$ and $N_{ID}^{(2)}$, then each AN-ID can be expressed by $N_{ID}^{node}=f(N_{ID}^{(3)})$ or $N_{ID}^{node}=f(N_{ID}^{cell}, N_{ID}^{(3)})$. That is, the AN-ID may be generated using a function of a cell ID, or may be generated independently from the cell ID.

When the AN-ID is allocated by the determined relation between the BS/cell ID and the AN-ID as described above, how to report the AN-ID to a UE is problematic. In the present invention, a method of reporting the AN-ID by using a physical layer signal is used.

That is, examples of the method of reporting the AN-ID to the UE may include: 1) a method of reporting the AN-ID by using a synchronization signal (or preamble); 2) a method of reporting the AN-ID by using a PBCH (or a superframe header); 3) a method of reporting the AN-ID by using a pilot signal or a reference signal; and so on.

1. Method of Reporting AN-ID by Using Synchronization Signal.

Although a conventional synchronization signal is generated using only a cell ID (or a BS ID), the present invention can generate the synchronization signal by using an AN-ID. That is, each antenna node can transmit a synchronization signal sequence generated using its AN-ID.

Figure 10:
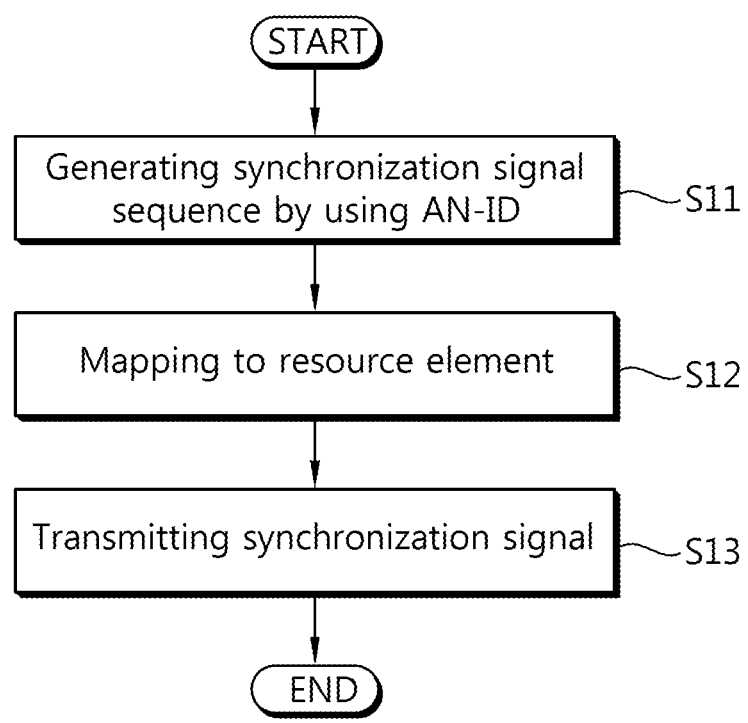
FIG. 10 is a flowchart showing a process of transmitting an AN-ID by using a synchronization signal.

FIG. 10 is a flowchart showing a process of transmitting an AN-ID by using a synchronization signal.

Referring to FIG. 10, a BS generates a synchronization signal sequence by using an AN-ID (step S11), maps the generated synchronization signal sequence to a resource element (step S12), and then transmits the synchronization signal sequence to a UE via an antenna node (step S13). In this case, a plurality of nodes may transmit same synchronization signal sequence. Hereinafter, a process of generating the synchronization signal sequence by using the AN-ID will be described.

For example, a sequence $d_u(n)$ of Equation 5 below can be used as a primary synchronization signal (PSS) sequence of LTE. $d_u(n)$ is generated from a Zadoff-Chu sequence of a frequency domain.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 5]}$$

In Equation 5, a Zadoff-Chu root sequence index u is given by the following table 1.

TABLE 1

| $N_{ID}^{(2)}$ | Root index$_u$ |
|---|---|
| 0 | 25 |
| 1 | 29 |
| 2 | 34 |

According to the present invention, when a legacy UE is supported, each antenna node may generate a PSS sequence by using Equations 5 and table 1 above in the same manner, and for a UE operating in a DAS, may generate a PSS sequence by using $N_{ID}^{(3)}$ which is a seed number of its AN-ID instead of using $N_{ID}^{(2)}$ of table 1.

In addition, a sequence $d(0), \ldots, d(61)$ used as a secondary synchronization signal (SSS) sequence in LTE is connected by interleaving two binary sequences having a length of 31. The connected sequence is scrambled by the use of a given scrambling sequence in the PSS.

A combination of a length-31 sequence that defines an SSS used in a subframe 0 and a subframe 5 is defined by Equation 7 below.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$ [Equation 7]

In Equation 7 above, n denotes a integer in the range of 0 to 30. Indices $m_0$ and $m_1$ are derived from $N_{ID}^{(1)}$ which is a seed number indicating a cell ID group according to Equation 8 below.

$$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$ [Equation 8]

In addition, sequences $s_0^{(m0)}(n)$ and $s_1^{(m1)}(n)$ of Equation 7 are defined as two different cyclic shifts of the m-sequence according to Equation 9 below.

$$s_0^{(m0)}(n) = \tilde{s}((n+m_0) \bmod 31)$$

$$s_1^{(m1)}(n) = \tilde{s}((n+m_1) \bmod 31)$$ [Equation 9]

In Equation 9, s(i) over which a tilde mark '~' is placed denotes $1-2\times(i)$, where x(i) is defined by Equation 10 below. Herein, i denotes an integer in the range of 0 to 30.

$$x(\bar{i}+5) = (x(\bar{i}+2)+x(\bar{i})) \bmod 2, \quad 0 \le \bar{i} \le 25$$ [Equation 10]

In Equation 10, an initial condition is $x(0)=0$, $x(1)=0$, $x(2)=0$, $x(3)=0$, $x(4)=1$.

Scrambling sequences $c_0(n)$ and $c_1(n)$ of Equation 7 depend on the PSS, and are defined by two different cyclic shifts of the m-sequence expressed by Equation 11 below.

$$c_0(n) = \tilde{c}((n+N_{ID}^{(2)}) \bmod 31)$$

$$c_1(n) = \tilde{c}((n+N_{ID}^{(2)}3) \bmod 31)$$ [Equation 11]

In Equation 11, $N_{ID}^{(2)}$ is any one of values 0, 1, and 2, and c(i) over which a tilde mark '~' is placed denotes $1-2\times(i)$, where x(i) is defined by Equation 12 below. Herein, i denotes an integer in the range of 0 to 30.

$$x(\bar{i}+5) = (x(\bar{i}+3)+x(\bar{i})) \bmod 2, \quad 0 \le \bar{i} \le 25$$ [Equation 12]

In Equation 12, an initial condition is $x(0)=0$, $x(1)=0$, $x(2)=0$, $x(3)=0$, $x(4)=1$.

Scrambling sequences $z_1^{(m0)}(n)$ and $z_1^{(m1)}(n)$ of Equation 7 are defined by Equation 13 below.

$$z_1^{(m0)}(n) = \tilde{z}((n+m_0 \bmod 8)) \bmod 31)$$

$$z_1^{(m1)}(n) = \tilde{z}((n+m_1 \bmod 8)) \bmod 31)$$ [Equation 13]

In Equation 13, z(i) over which a tilde mark '~' is placed denotes $1-2\times(i)$, where x(i) is defined by Equation 14 below. Herein, i denotes an integer in the range of 0 to 30.

$$x(\bar{i}+5) = (x(\bar{i}+4)+x(\bar{i}+2)+x(\bar{i}+1)+x(\bar{i})) \bmod 2, \quad 0 \le \bar{i} \le 25$$ [Equation 14]

In Equation 14, an initial condition is $x(0)=0$, $x(1)=0$, $x(2)=0$, $x(3)=0$, $x(4)=1$.

As described above, the conventional SSS is configured with a sequence identified by $N_{ID}^{(1)}$. When a legacy UE is supported, each node may generate an SSS sequence by using $N_{ID}^{(1)}$ indicating a cell ID group and thereafter transmit the generated SSS sequence, and when a UE operating in a DAS is supported, each node may generate the SSS sequence by using $N_{ID}^{(3)}$ which is a seed number of an AN-ID instead of using $N_{ID}^{(1)}$, and thereafter transmit the generated SSS sequence.

In addition to a method of generating and transmitting a new synchronization signal sequence by using an AN-ID, as described above, a method of scrambling the conventional synchronization signal (i.e., PSS, SSS, and preamble) with a sequence generated using an AN-ID and transmitting the scrambled synchronization signal is also possible.

Figure 11:
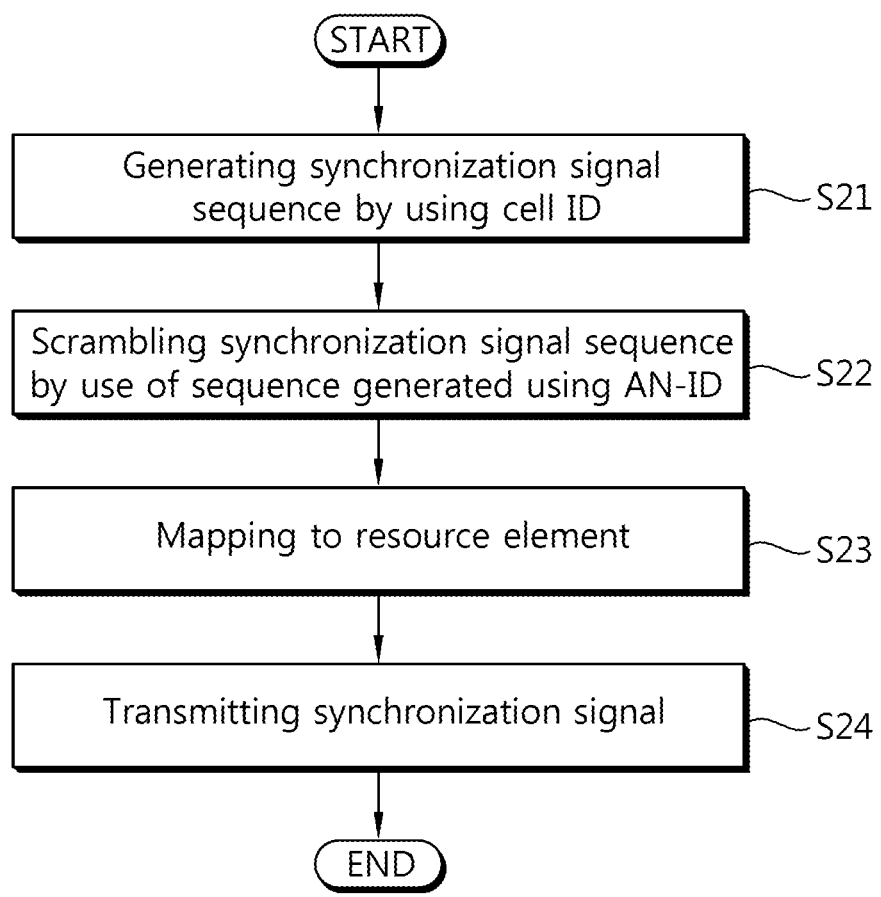
FIG. 11 shows a method for scrambling a synchronization signal by the use of a sequence generated using an AN-ID and for transmitting the sequence.

FIG. 11 shows a method for scrambling a synchronization signal by the use of a sequence generated using an AN-ID and for transmitting the scrambled synchronization signal.

Referring to FIG. 11, a BS generates a synchronization signal sequence by using a cell ID (step S21), and scrambles the generated synchronization signal sequence by the use of a sequence generated using an AN-ID (step S22).

For example, the BS may scramble PSS and SSS sequences generated using a cell ID by the use of a scrambling sequence generated using an AN-ID (e.g., a seed number $N_{ID}^{(3)}$) and then transmit the scrambled PSS or SSS sequences. The scrambling sequence can utilize any sequence having a low correlation characteristic. For example, an m-sequence, a Zadoff-Chu sequence, or the like can be utilized. A UE may descramble the scrambled PSS or SSS sequence with a sequence for each of a plurality of AN-IDs within a multi-node system, and if decoding succeeds, can know a corresponding seed number $N_{ID}^{(3)}$, and thus can know the AN-ID. That is, the UE can perform blind detection.

The BS can provide backward compatibility in such a manner that a synchronization signal is transmitted by performing scrambling by the use of a dummy sequence such as $\{1, 1, \ldots, 1\}$ with respect to an antenna node supporting a legacy UE.

For example, if a high-power antenna node such as a macro transmitting tower is present in the center of a service area of a DAS and low-power antenna nodes are present in a distributed manner in several places other than the center, the high-power antenna node in the center can send a signal to most regions within system coverage. In this case, the high-power antenna node provides backward compatibility by transmitting a synchronization signal which is scrambled by the use of the dummy sequence as described above, and for UEs having enhanced functions, the low-power antenna nodes which are present in a distributed manner can send a synchronization signal generated using a sequence dependent on an AN-ID instead of using the dummy sequence.

Referring back to FIG. 11, the BS maps the scrambled synchronization signal to a resource element (step S23), and transmits the signal to the UE via an antenna node (step S24).

Figure 12:
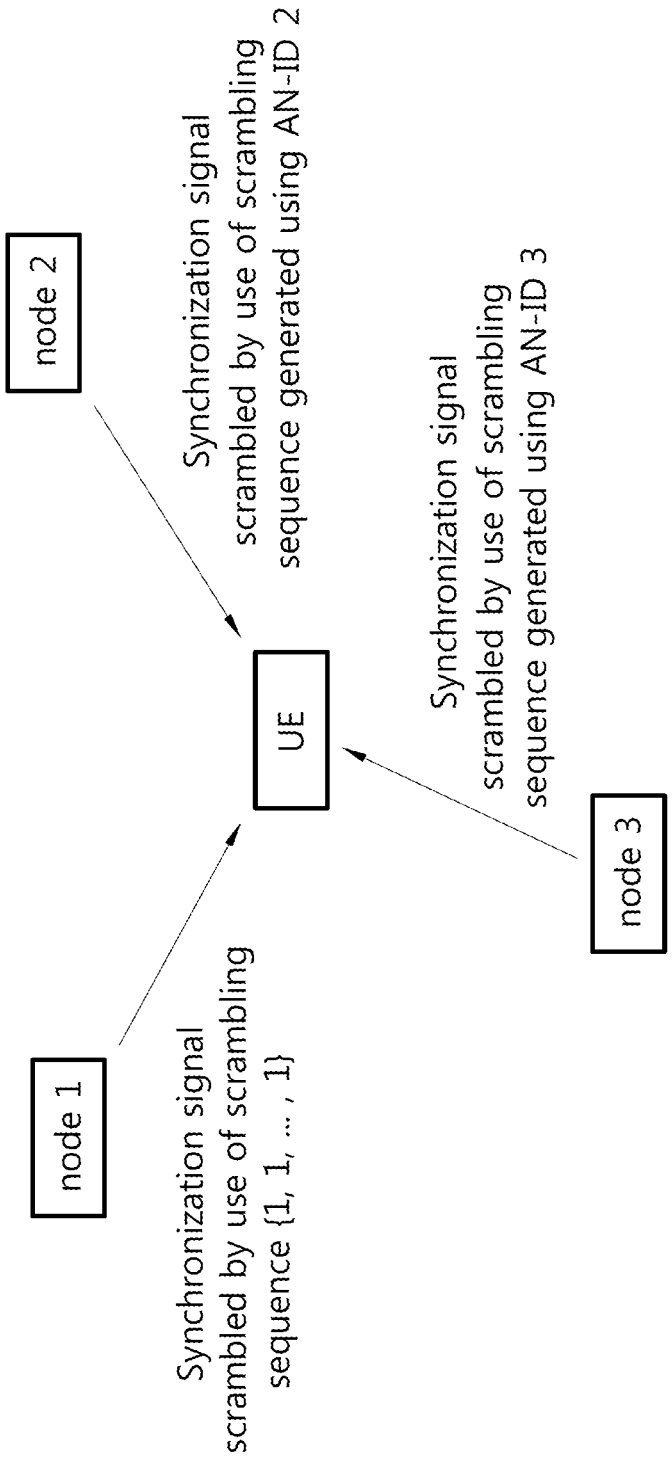
FIG. 12 shows an example of a plurality of antenna nodes for scrambling a synchronization signal by the use of a sequence generated using an AN-ID and thereafter transmitting the signal to a user equipment.

FIG. 12 shows an example of a plurality of antenna nodes for scrambling a synchronization signal by the use of a sequence generated using an AN-ID and thereafter transmitting the signal to a UE.

Referring to FIG. 12, an antenna node 1 scrambles a synchronization signal by the use of a dummy sequence {1, 1, . . . , 1} and then transmits a synchronization signal which is the same as the conventional one. On the other hand, an antenna node 2 and an antenna node 3 transmit to a UE a synchronization signal which is scrambled by the use of a sequence generated using their AN-IDs.

In addition to a method of scrambling the conventional synchronization signal by using the AN-ID, a new synchronization signal may be generated using the AN-ID. That is, in this method, a third synchronization signal (TSS) is defined in addition to a PSS and an SSS. The TSS can be transmitted by using a different sequence and/or a resource element for each antenna node. In addition, a resource element for transmitting the TSS can be distinguished from a resource element for transmitting the PSS or the SSS.

In addition to a role of delivering an AN-ID (e.g., a seed number $N_{ID}^{(3)}$) to the UE, the TSS can play a role of performing more correct time and/or frequency synchronization with respect to an antenna node. For example, when distributed antenna nodes coupled to one BS constitute one large cell, a high-power antenna node (i.e., node 1) in a cell center may transmit the PSS and the SSS and remaining low-power nodes (i.e., nodes 2, 3, . . . ) may transmit the TSS. In this case, the UE which accesses to the cell first performs cell synchronization to the PSS and the SSS provided in the node 1. Thereafter, if antenna node synchronization is necessary and/or if an AN-ID needs to be received, then the TSS provided from an adjacent low-power node can be received. In this case, an antenna node for providing (or receiving) the TSS may change instantaneously when the UE moves within the cell.

Figure 13:
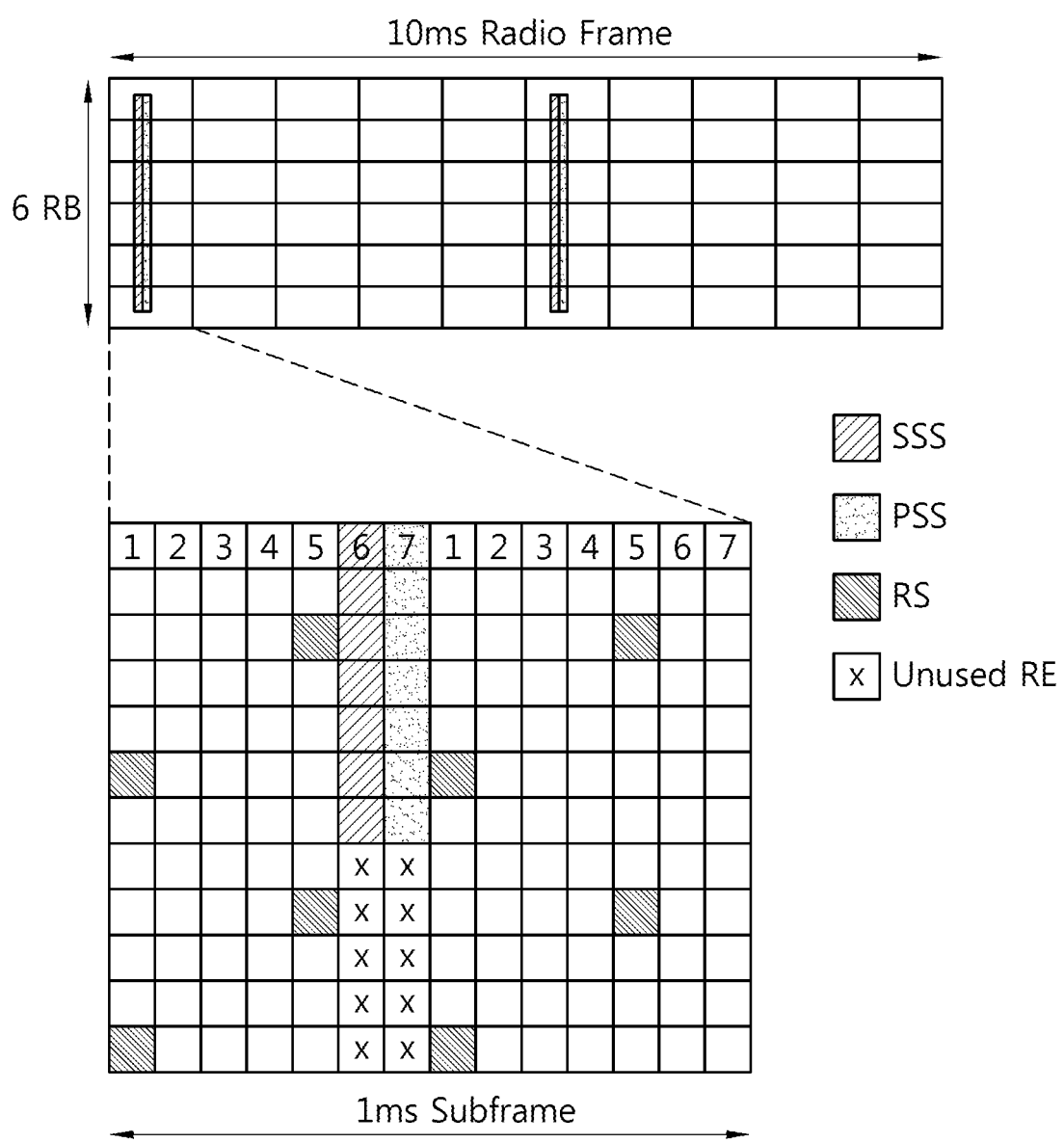
FIG. 13 shows an example of a resource region for transmitting a synchronization signal which is scrambled by the use of a sequence generated using an AN-ID according to the present invention.

FIG. 13 shows an example of a resource region for transmitting a synchronization signal which is scrambled by the use of a sequence generated using an AN-ID according to the present invention.

Referring to FIG. 13, the synchronization signal which is scrambled by the use of the sequence generated using the AN-ID (hereinafter, such a signal is referred to as an antenna node synchronization signal) can be transmitted in last two OFDM symbols of a $1^{st}$ slot and last two OFDM symbols of an $11^{th}$ slot in a frame in the same manner as the conventional synchronization signal. In a frequency domain, the antenna node synchronization signal can be transmitted at a minimum bandwidth of a system band. For example, the antenna node synchronization signal can be transmitted across consecutive 6 RBs.

Alternatively, the antenna node synchronization signal can be transmitted in a resource region in which a legacy UE does not recognize a synchronization signal. For example, when using a carrier aggregation, the antenna node synchronization signal can be transmitted by using a carrier which cannot be recognized by the legacy UE. This is because, when the antenna node synchronization signal is transmitted in the same resource region as the conventional synchronization signal, there is a possibility that the legacy UE incorrectly recognizes the antenna node synchronization signal as the conventional synchronization signal having a different cell ID.

Alternatively, the antenna node synchronization signal can be transmitted by using some resource elements of a carrier used by the legacy UE. In this case, the some resource elements may be limited to a resource element which does not have to be received by legacy UEs in a specific condition, such as a resource region for transmitting a PDSCH.

That is, the antenna node synchronization signal can be transmitted in a region for transmitting the conventional synchronization signal or can be transmitted in a resource region different from that of the conventional synchronization signal.

2. Method of Reporting AN-ID by Using PBCH (or Superframe Header).

Hereinafter, a method of reporting an AN-ID to a UE by using a PBCH will be described.

As described above, the UE obtains a cell ID by performing time/frequency synchronization from a synchronization signal in order to access to a specific system. Thereafter, the UE obtains a system parameter by using a PBCH (or a superframe header (SFH)). The UE uses the obtained system parameter to attempt cell entry. A signal transmitted through the PBCH is transmitted after being scrambled by the use of the conventional cell-specific sequence.

On the other hand, in the present invention, the signal transmitted through the PBCH is transmitted after being scrambled by the use of a sequence corresponding to each AN-ID.

Figure 14:
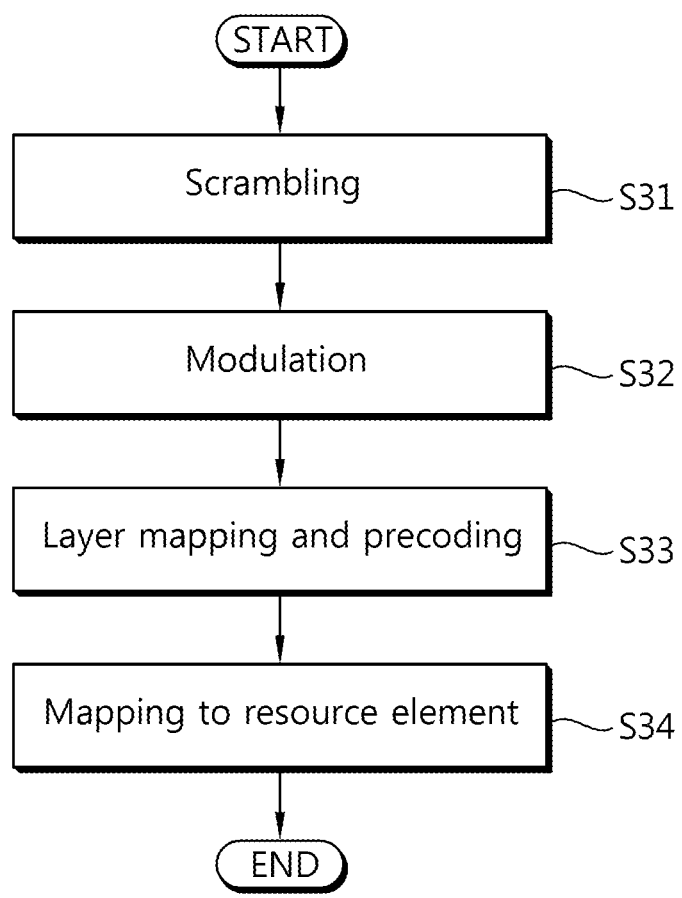
FIG. 14 shows a PBCH transmission process according to an embodiment of the present invention.

FIG. 14 shows a PBCH transmission process according to an embodiment of the present invention.

Referring to FIG. 14, a BS scrambles a signal transmitted through a PBCH by the use of a sequence generated using an AN-ID (step S31).

For example, if the signal transmitted through the PBCH is a bit block b(0), . . . , b($M_{bit}$−1), scrambling bits which are obtained after being scrambled by the use of a sequence generated using an AN-ID can be generated by Equation 15 below.

$$\tilde{b}(i)=(b(i)+c(i))\bmod 2 \quad \text{[Equation 15]}$$

The scrambling sequence of Equation 15 can be given by Equation 16 below.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 16]}$$

In Equation 16, $N_c$ is 1600, and a $1^{st}$ m-sequence starts with x1(0)=1, x1(n)=0, n=1, 2, . . . , 30. A $2^{nd}$ m-sequence may start according to Equation 17 below.

$$c_{init}=\Sigma_{i=0}^{30} x_2(i)\cdot 2^i \quad \text{[Equation 17]}$$

The aforementioned scrambling sequence starts with $c_{init}=N_{ID}^{node}$ in each radio frame satisfying an expression of ($n_f \bmod 4=0$). Here, $n_f$ is a system frame number. That is, a signal transmitted through a PBCH is scrambled by the use of a sequence generated using an AN-ID.

The scrambled PBCH signal is modulated (step S32).

That is, a block of scrambled bits is modulated into modulation symbols d(0), ..., d($M_{symb}$−1) having complex values. In the PBCH, quadrature phase-shift keying (QPSK) can be used as a modulation scheme.

Modulated symbols are subjected to layer mapping and precoding (step S33).

That is, after being subjected to layer mapping, a block d(0), d($M_{symb}$−1) of modulation symbols is subjected to precoding, and thus becomes a block of vectors expressed by Equation 18 below.

$$y(i)=[y^{(0)}(i) \ldots y^{(P-1)}(i)]^T \quad \text{[Equation 18]}$$

In Equation 18, $y^{(p)}(i)$ denotes a signal for an antenna port p, where p has a value of 0, ..., P−1. For example, an antenna port for a cell-specific reference signal has a number P∈ {1, 2, 4}.

Thereafter, the vector block is mapped to a resource element (step S34), and then is transmitted.

In the aforementioned process, a PBCH signal can be transmitted during 4 consecutive radio frames. In this case, a radio frame at which transmission starts may be a radio frame satisfying an expression of ($n_f$ mod 4=0).

Upon receiving the PBCH signal, a UE can perform blind detection on an AN-ID according to a method of descrambling all AN-IDs within a multi-node system by the use of a corresponding sequence.

Alternatively, a BS may differently configure a broadcast message transmitted through the PBCH instead of directly changing a physical layer signal transmitted through the PBCH. In general, the broadcast message transmitted through the PBCH is for transmitting the same information to all UEs. However, in the present invention, the information is transmitted such that a part of the information differs for each antenna node. For example, each antenna node may transmit a broadcast message (e.g., MIB) by adding its AN-ID. Then, a UE in a DAS receives the broadcast message transmitted from an adjacent antenna node and thus can identify an AN-ID.

3. Method of Reporting AN-ID by Using Pilot Signal or Reference Signal.

In a multi-node system such as a DAS, a pilot or a reference signal can be transmitted differently for each antenna node. In doing so, a UE can obtain an AN-ID. In an effective method of transmitting the pilot differently for each antenna node without using a new pilot pattern in a global midamble format, sequences which are orthogonal to each other to the maximum extent possible are used for each antenna node. That is, pilot sequences which are orthogonal to each other to the maximum extent possible are used according to the AN-ID. When using such a method, if the number of antennas of one antenna node is limited up to 8, existing pilot pattern specified in the time and frequency domains can be reused. For example, it can be specified such that a legacy UE can be supported by using a pilot sequence which is the same as the conventional one in some antenna nodes. The antenna nodes that use the same pilot sequence can be recognized as one same node to the legacy UE.

4. Method of Reporting AN-ID Through Higher Layer Signal.

In this method, after an RRC connection is established between a BS and a UE, information on each antenna node is delivered to the UE by using a higher layer signal, for example, by using RRC signaling.

Figure 15:
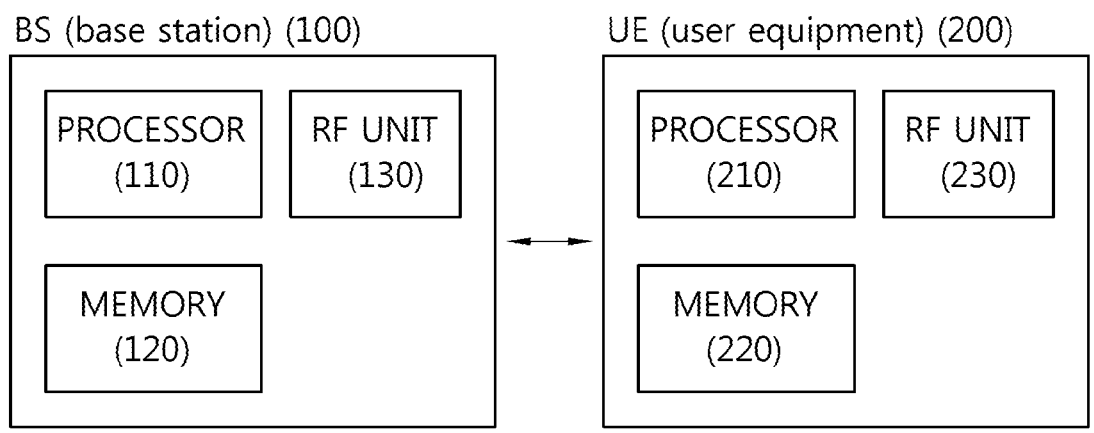
FIG. 15 is a block diagram showing a base station and a user equipment.

FIG. 15 is a block diagram showing a BS and a UE.

A BS 100 includes a processor 110, a memory 120, and a radio frequency (RF) unit 130. The processor 110 implements the proposed functions, processes, and/or methods. That is, the processor 110 can broadcast node information to the UE, and can perform scheduling on the basis of feedback information transmitted from the UE. The memory 120 is coupled to the processor 110, and stores a variety of information for driving the processor 110. The RF unit 130 is coupled to the processor 110, and transmits and/or receives a radio signal. The RF unit 130 can consist of a plurality of nodes coupled to the BS 100 in a wired fashion.

A UE 200 includes a processor 210, a memory 220, and an RF unit 230. The processor 210 receives node information from the BS, and receives a reference signal of each node. The processor 210 can use the node information and the reference signal to identify which node transmits a signal, and then can generate and transmit feedback information. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antenna ports for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

A method and apparatus for transmitting a synchronization signal capable of identifying each node in a multi-node system are provided. According to the present invention, a user equipment can know an identifier (ID) of each node in the multi-node system by using the synchronization signal. Such a node ID can be utilized in a handover and bandwidth request process of the user equipment.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting a synchronization signal in a multi-node system including a plurality of nodes and a base station for controlling the plurality of node, the method comprising:
generating a synchronization signal sequence;
mapping the generated synchronization signal sequence to a resource element; and
transmitting the mapped synchronization signal sequence to a user equipment via at least one node among the plurality of nodes,
wherein the synchronization signal sequence is generated based on an identifier (ID) of a transmission node for transmitting the synchronization signal sequence, and
wherein the synchronization signal sequence is generated by scrambling a sequence generated using a cell ID group $N_{ID}^{(1)}$ or an ID $N_{ID}^{(2)}$ included in the cell ID group, which are seed numbers constituting an ID of a cell controlled by the base station, by the use of a sequence generated using a seed number $N_{ID}^{(3)}$ for determining the ID of the transmission node.

2. The method of claim 1, wherein the ID for the transmission node has a pre-defined mapping relation with respect to an ID of the base station or an ID of a cell controlled by the base station.

3. The method of claim 2, wherein:
the ID of the transmission node coincides with at least one of seed numbers constituting the ID of the base station or the cell controlled by the base station; and
the seed number includes:
a seed number $N_{ID}^{(1)}$ indicating a cell ID group; and
a seed number $N_{ID}^{(2)}$ indicating an ID included in the cell ID group.

4. The method of claim 2, wherein, when the ID of the transmission node consists of N bits, the ID of the base station or the cell controlled by the base station consists of upper M bits out of the N bits, where N and M are natural numbers, and where N is greater than M.

5. The method of claim 1, wherein the synchronization signal sequence is a sequence generated using a seed number $N_{ID}^{(3)}$ for determining the ID of the transmission node.

6. The method of claim 1, wherein the synchronization signal sequence is allocated to 63 subcarriers in a frequency domain, and is transmitted in last two OFDM symbols of 1st and 11th slots within a frame in a time domain.

7. The method of claim 1, wherein the synchronization signal generated based on the ID of the transmission node is transmitted by using a resource element different from that of a synchronization signal generated based on an ID of a cell controlled by the base station.

8. The method of claim 1, wherein each of the plurality of nodes comprises an antenna coupled to the base station in a wired fashion.

9. A method of receiving a synchronization signal of a user equipment in a multi-node system having a plurality of nodes and a base station for controlling the plurality of node, the method comprising:
receiving a synchronization signal based on an ID of a cell controlled by the base station; and
receiving a synchronization signal based on an ID of at least one node among the plurality of nodes,
wherein the synchronization signal based on an ID of at least one node comprises a synchronization signal sequence, and
wherein the synchronization signal sequence is generated by scrambling a sequence generated using a cell ID group $N_{ID}^{(1)}$ or an ID $N_{ID}^{(2)}$ included in the cell ID group, which are seed numbers constituting an ID of a cell controlled by the base station, by the use of a sequence generated using a seed number $N_{ID}^{(3)}$ for determining the ID of the transmission node.

10. The method of claim 9, wherein each of the plurality of nodes comprises an antenna coupled to the base station in a wired fashion.

11. An apparatus for transmitting a synchronization signal, the apparatus comprising:
a radio frequency (RF) unit configured to transmit and receive a radio signal, the RF unit including a plurality of antennas deployed in a distributed manner; and
a processor coupled to the RF unit, the processor being configured to:
generate a synchronization signal sequence,
map the generated synchronization signal sequence to a resource element, and
transmit the mapped synchronization signal sequence to a user equipment via at least one node among the plurality of nodes,
wherein the synchronization signal sequence is generated based on an ID of a transmission node for transmitting the synchronization signal sequence, and
wherein the synchronization signal sequence is generated by scrambling a sequence generated using a cell ID group $N_{ID}^{(1)}$ or an ID $N_{ID}^{(2)}$ included in the cell ID group, which are seed numbers constituting an ID of a cell controlled by the base station, by the use of a sequence generated using a seed number $N_{ID}^{(3)}$ for determining the ID of the transmission node.

* * * * *